United States Patent [19]

Kou

[11] Patent Number: 4,619,189

[45] Date of Patent: Oct. 28, 1986

[54] APPARATUS FOR MANUFACTURING BOILED NOODLES

[75] Inventor: Nagai Kou, Takasaki, Japan

[73] Assignee: Hoshino Butsusan Co., Ltd., Gunma, Japan

[21] Appl. No.: 697,840

[22] Filed: Feb. 4, 1985

[30] Foreign Application Priority Data

Feb. 17, 1984 [JP] Japan .................. 59-26987

[51] Int. Cl.⁴ .......................................... A47J 27/10
[52] U.S. Cl. ................................. 99/334; 99/337; 99/344; 99/353; 99/404; 99/407; 99/416; 425/376 R; 425/464; 426/451; 426/557
[58] Field of Search ............... 99/334, 335, 336, 353, 99/342, 344, 404, 407, 416, 337, 403; 426/451, 523, 557; 425/190, 376 R, 464

[56] References Cited

U.S. PATENT DOCUMENTS

| | | | |
|---|---|---|---|
| 2,366,366 | 1/1945 | Souder | 426/557 |
| 2,669,195 | 2/1954 | Pellegrino | 426/451 |
| 2,792,304 | 5/1957 | Pavan | 426/557 |
| 3,022,722 | 2/1962 | Arvan | 99/404 |
| 3,036,513 | 5/1962 | Reeves | 99/404 |
| 3,318,707 | 5/1967 | Ernst | 426/451 |
| 3,773,520 | 11/1973 | Longenecker | 99/353 X |
| 3,937,848 | 2/1976 | Campbell | 99/353 X |
| 4,121,301 | 10/1978 | DeFrancisci | 99/353 |
| 4,250,802 | 2/1981 | Rubio | 99/353 X |
| 4,360,332 | 11/1982 | Cyin | 99/353 X |
| 4,367,064 | 1/1983 | Prandelli | 425/376 R X |

FOREIGN PATENT DOCUMENTS

| | | | |
|---|---|---|---|
| 1119118 | 6/1956 | France | 99/353 |
| 2515001 | 4/1983 | France | 99/353 |
| 1513507 | 6/1978 | United Kingdom | 99/334 |

Primary Examiner—Billy J. Wilhite
Attorney, Agent, or Firm—Wenderoth, Lind & Ponack

[57] ABSTRACT

The present invention provides an apparatus for manufacturing boiled noodles. The apparatus comprises substantially a raw noodle manufacturing unit, a boiling unit for boiling raw noodle elements fabricated by the raw noodle manufacturing unit and a control unit controlling operations of the raw noodle manufacturing unit and the boiling unit. According to the apparatus, each meal of the boiled noodles can be automatically fabricated during a short time interval, by supplying and measuring grain flour and kneading water, fabricating the raw noodle elements automatically and boiling the raw noodle elements automatically by means of controlling the operations of the apparatus.

16 Claims, 12 Drawing Figures

APPARATUS FOR MANUFACTURING BOILED NOODLES

BACKGROUND OF THE INVENTION a. Field of the Invention

The present invention relates to an apparatus for manufacturing boiled noodles and, more particularly to an apparatus for manufacturing a predetermined number of meals of noodles.

b. Prior Art

Noodles are generally manufactured by a hand-made manufacturing method and by a noodle manufacturing machine. In the prior art method and apparatus for manufacturing a hand-made noodle, the following steps are carried out:

mixing and kneading a mixture of wheat flour and about forty-five percent of water containing a salt to form a noodle substrate, producing an elasticity of the substrate by means of kneading the noodle substrate, rolling the noodle substrate, aging the substrate of the noodle, pressing and expanding the substrate by scattering a wheat flour, folding up after pressing, and slicing and cutting the substrate to form raw noodle elements.

Accordingly, the prior art hand-made noodle manufacturing method required at least several hours in order to obtain the raw noodle elements as well as twelve hours in preparation the previous day and further required fifteen to twenty minutes in order to boil the raw noodle elements. When the noodle is made by the prior art noodle manufacturing machine, twenty five minutes was required to boil the raw noodle elements, because the quantity of the water to be added to the grain flour is less than that used in the hand-made noodle, and higher pressing must be applied to the substrate of noodle in comparison with the hand-made manufacturing method.

Although the manufacturing time is shortened by the noodle manufacturing machine, the prior art noodle manufacturing method and apparatus had the following disadvantages: the installing area and space must be large; a corner of the noodle was removed from the noodle element as well as the noodle element was melted since a long boiling time interval was necessiated; and that taste of the noodles suffered due to the half boiling of the noodles.

It is known that noodles are most delicious immediately after boiling of the noodles. From the above described noodle manufacturing and boiling conditions of the prior art method and apparatus, shops for selling buckwheats and noodles usually manufactured and boiled the vermicelli before opening the shop in accordance with the estimated demand of the customers and offered the noodles according to the order of each customer during business hours. It was, accordingly, impossible to serve the most delicious noodles to the customer immediately after boiling of the noodles, as well as it was inevitable to generate waste such as the unsold noodles.

The vermicelli in the form of a dried noodle, a macaroni or the like is manufactured by a noodle belt cutting out manufacturing method or a pressure applying and pushing method and drying process, the good maintenance can be obtained however the long boiling time duration is required. The vermicelli is stored from the boiled condition and accordingly it is impossible to provide a delicious noodle immediately after boiling up. The waiting time of the customer becomes long and waste due to excess preparation of noodles can not be eliminated.

Furthermore, in the general shop such as a buckwheat shop, a customer visiting the shop may order different kinds of Japanese noodle or Chinese-style noodle. Even when the customer orders the Japanese noodle, an old person orders the soft boiled noodle, and a young man orders hard boiled noodle. It is, however, impossible to respond to the various orders, because the about ten meals of the vermicelli are boiled by employing a boiling basket in the shop. This is the same in the Italian style shop selling the macaroni and the spaghetti and the Chinese-style shop selling the Chinese-style vermicelli.

It is, further, well known that the hand-made buckwheat, the hand-made Japanese noodle and the Chinese-style noodle are more delicious than those manufactured by machine. It is, however, very hard to master the technique for fabricating delicious noodles, as well as much labor is required.

BRIEF SUMMARY OF THE INVENTION

It is an object of the present invention to provide an apparatus for manufacturing boiled noodles which can resolve all the problems described above.

It is an object of the present invention to provide an apparatus which can fabricate the boiled noodles during very short time interval and which can offer the most delicious boiled noodles, according to the tastes of the customers.

More particularly, according to the present invention, there is provided a boiled noodle manufacturing apparatus comprising a raw noodle manufacturing unit including a grain flour supplying member for measuring and supplying a grain flour, a kneading member for kneading said grain flour which includes a worm-shaped screw and a blade, the kneading member being connected to said grain flour supplying member, a kneading water supplying member for automatically measuring and supplying a kneading water for kneading said grain flour and a noodle element forming member connected to said kneading member and for forming raw noodle elements, and a boiling unit for boiling raw noodle elements fed from said noodle element forming member, a rotating wheel for hanging a boiling basket for receiving the raw noodle elements engagably and disengagably and being intermittently rotatable, a sensor means for producing an electric signal by means of sensing the boiling basket passing through a predetermined position, a controlling unit for generating a signal as an electric signal corresponding to the predetermined number of meals and the kinds of the noodle, whereby a predetermined set of one meal is fabricated from a grain flour by controlling the start and the stop of the boiling unit by said electric signal.

BRIEF DESCRIPTION OF THE DRAWINGS

The object, advantages and other features of the present invention will be more apparent from the following description of a preferred embodiment thereof, made with reference to the accompanying drawings in which.

DETAILED DESCRIPTION OF THE PREFERRED EMBODIMENTS

Figure 1:
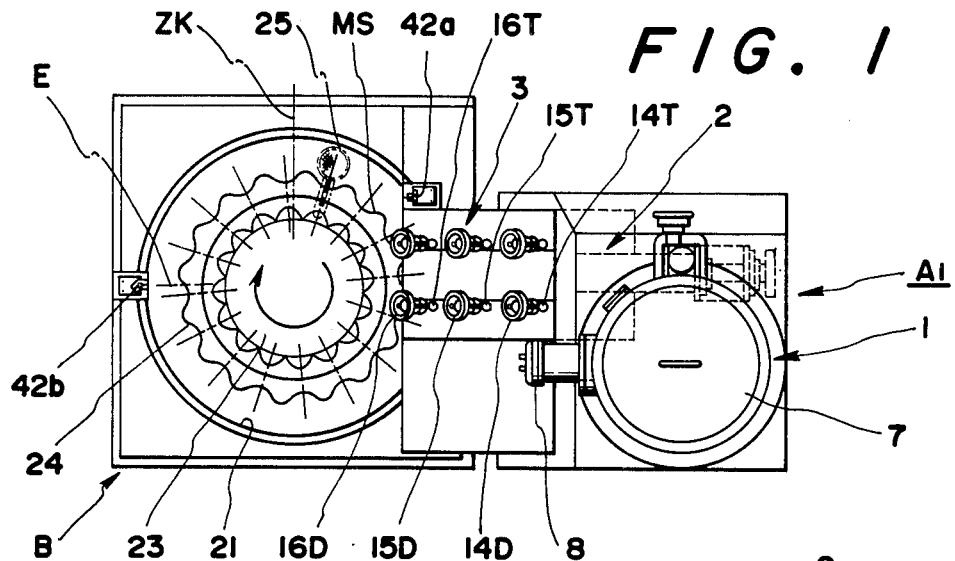
FIG. 1 is a plan view of a boiled noodles manufacturing apparatus of a first embodiment of the present invention.
Figure 2:
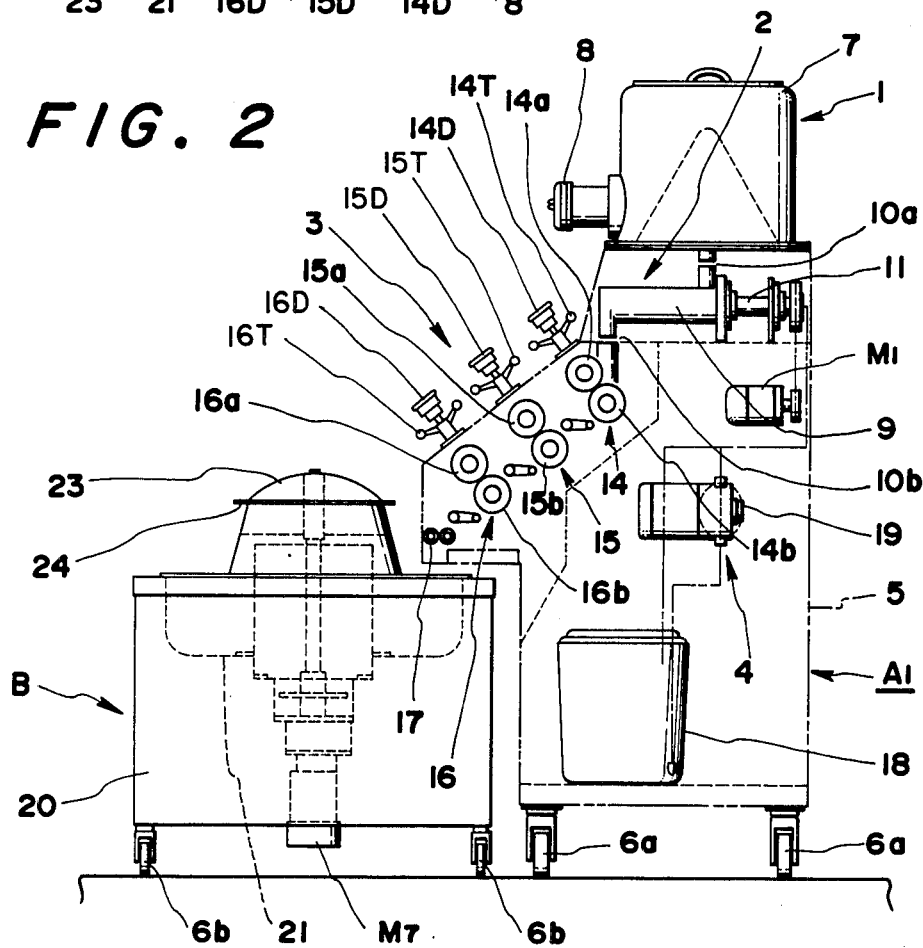
FIG. 2 is a side elevation view of the boiled noodles manufacturing apparatus of FIG. 1.
Figure 3:
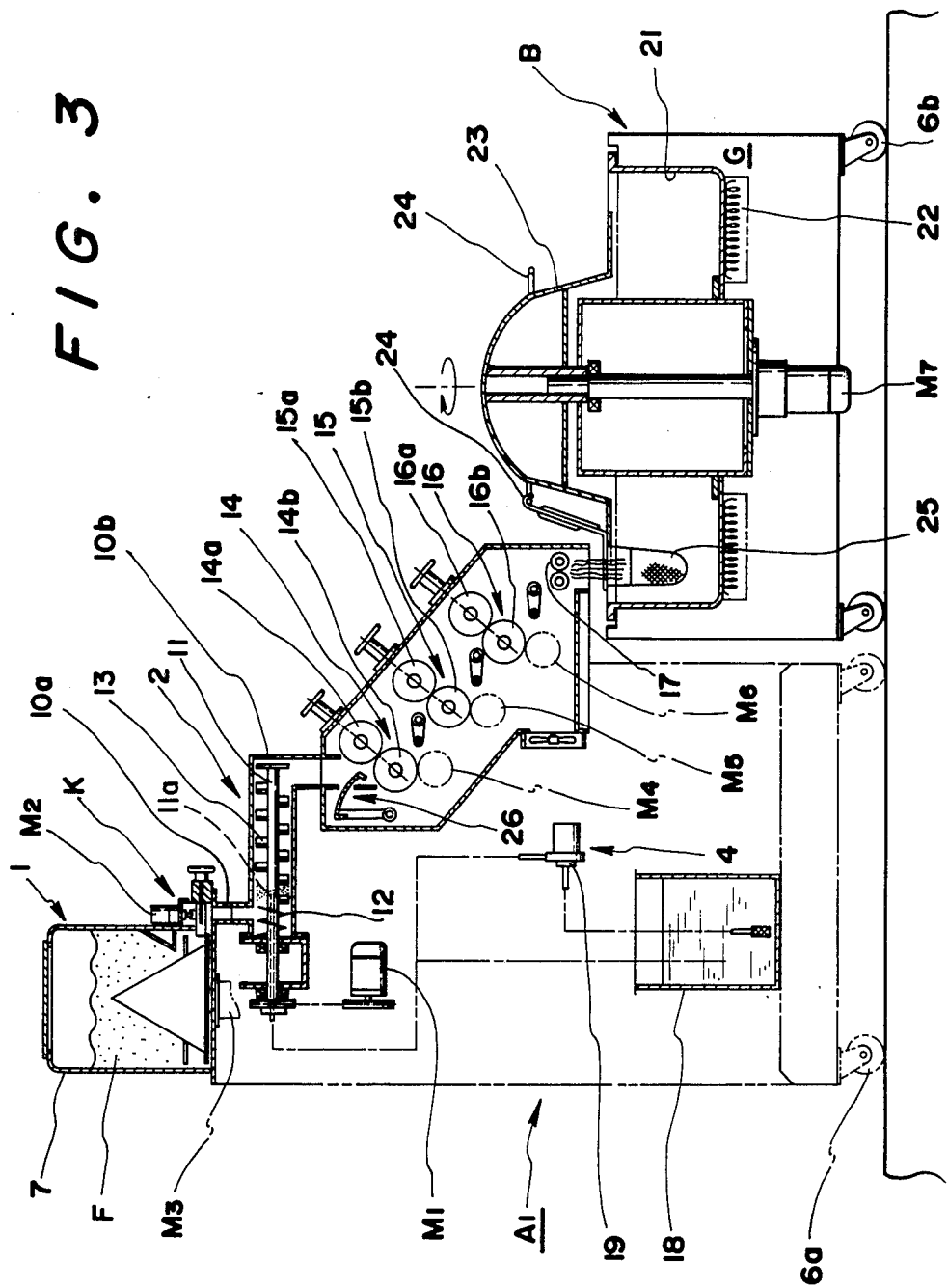
FIG. 3 is a sectioned side elevation view of the boiled noodles manufacturing apparatus of FIG. 1.

Referring to FIGS. 1 to 3 of the drawings, there is shown a boiled noodles manufacturing apparatus of the present invention. The boiled noodles manufacturing apparatus comprises, substantially, a raw noodle manufacturing unit $A_1$ for fabricating raw noodle elements, and a boiling unit B for boiling the raw noodle elements.

The raw noodle manufacturing unit $A_1$ is provided with a grain flour supplying member 1 for automatically weighing and supplying the grain flour, a kneading member 2 for kneading a mixture of grain flour and kneading water and for producing a grain paste, a kneading water supplying member 4 for automatically measuring and supplying the kneading and mixing water to the kneading member 2, and a noodle element forming member 3 for forming raw noodle elements. Each of the kneading member 2, the noodle element forming member 3 and the kneading water supplying member 4 is accomodated in a housing 5 supported movably on casters 6a.

The grain flour supplying member 1 is provided with a container 7 arranged on an upper end portion of the housing 5, and a grain flour indicator 8 mounted on the container 7 and for indicating the quantity of the grain flour in the container 7. The kneading member 2 is located below and to one side of the grain flour supplying member 1. As is shown in FIGS. 2 and 3, the kneading member 2 comprises a cylindrical tube 9, a spout 10a communicating the cylindrical tube 9 with the container 7 of the grain flour supplying member 1, a second spout 10b communicated with the cylindrical tube 9, and a rotating shaft 11 having a worn shaped screw wing 12, a blade 13 to form a high speed rotating beater, and a driving motor $M_1$ for driving the beater.

The noodle element forming member 3 is arranged at a lower side of the kneading member 2 and comprises a cogging roller 14 having rolls 14a and 14b for coarsely rolling a noodle substrate, a rolling roller 15 having rolls 15a and 15b for rolling the noodle substrate roughly rolled by the cogging roller 14, a finishing roller 16 having rolls 16a and 16b for rolling the noodle substrate precisely, and a cutting roller 17 for fabricating the noodle elements by cutting and slicing the noodle substrate.

Figure 4:
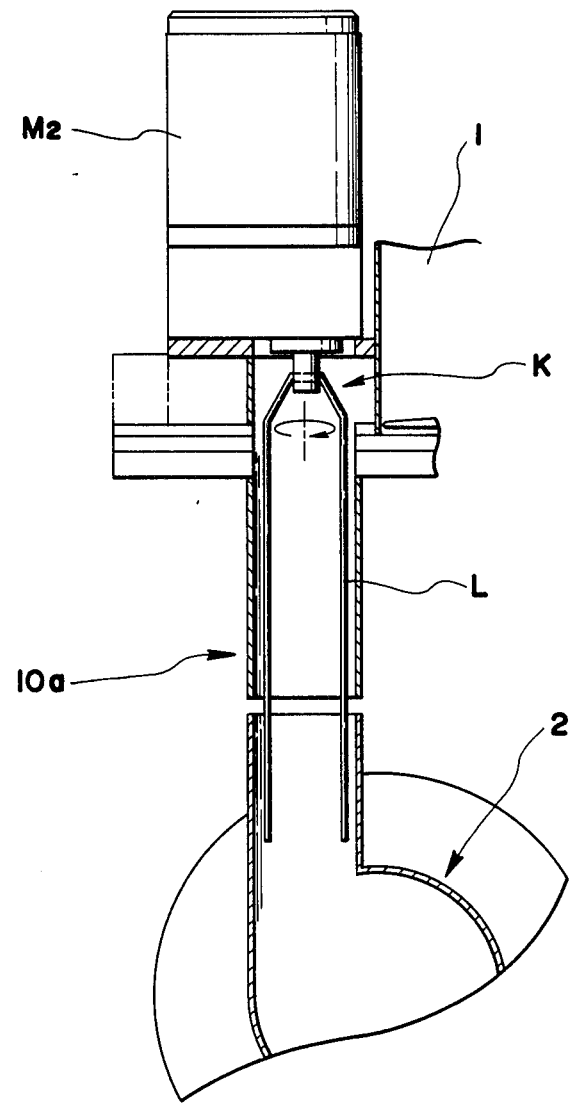
FIG. 4 is a partially sectioned elevation view of a portion of the boiled noodles manufacturing apparatus of FIG. 1.

The kneading water supplying member 4 comprises a kneading water tank 18 for storing and supplying the kneading water to the kneading member 2, and a flow quantity adjusting valve 19 for adjusting the flow quantity of the kneading water to the kneading member 2. The grain flour supplying member 1 and the kneading water supplying member 4 are automatically started and stopped in every suppliment of the quantities corresponding to one meals of the grain flour and the kneading water. It is preferable to provide a bridge preventing member K between the grain flour supplying member 1 and the kneading member 2 as is shown in FIG. 2. As is best shown in FIG. 4, the bridge preventing member K is equipped with a scraper L connected to an actuating motor $M_2$. The scraper L is provided in the first spout 10a and is rotated by the actuating motor $M_2$ when the grain flour supplying member 1 operates and thereby prevents the generation of a bridge which might occur by the sticking of the grain flour.

The boiling unit B comprises, substantially, a housing 20 movably supported by casters 6b, a boiling over in the form of an electrically heated tank 21 having an electric heater 22, a rotation wheel 23 mounted rotatably above the tank 21 and rotating motor $M_7$ for driving the rotation wheel 23. The tank 21 is mounted in the housing 20 by way of an adiabatic material G. The rotation wheel 23 is provided with a plurality of hanging hooks 24. A predetermined number of boiling baskets 25 are hung on the hanging hooks 24 so as to be inserted into the boiling oven.

A predetermined quantity of grain flour corresponding to a predetermined number of meals is set in the kneading member 2 and the corresponding amount of grain flour is supplied from the grain flour supplying member 1 to the kneading member 2 during a predetermined number of seconds. The grain flour supplied from the grain flour supplying member 1 is scattered in the kneading member 2 and is mixed with the kneading water supplied from the kneading water supplying member 4.

A kneaded substrate is ejected and supplied to the noodle element forming member 3. In the noodle element forming member 3, the substrate of noodle is coarsely rolled by the cogging roller 14. Next, the substrate of noodle rolled by the cogging roller 14 is expanded by the rolling roller 15. The noodle substrate expanded by the rolling roller 15 is then uniformly expanded by the finishing roller 16 and thereafter sliced and cut by the cutting roller 17 to form the raw noodle elements.

The kneading water is supplied from the tank 18 to a slot provided on the inner side of the rotating shaft 11 of the mixing member 2 and is sprayed into the cylindrical tube 9 by way of an ejecting hole 11a provided on the rotating shaft 11. The predetermined quantity of grain flour is supplied to the cylindrical tube 9 from the grain flour supplying member 1 through the first spout 10a. The grain flour supplied to the kneading member 2 is mixed with the kneading water ejected from the ejecting hole 11a.

In the kneading member 2, a measured amount of grain flour for one meals is supplied at a given timing. The grain flour supplied to the kneading member 2 is scattered by the high speed rotation of the worm-shaped screw wing 12 and is mixed with the kneading water to be instantaneously hydrated, and thereafter a gluten is created instantaneously. The created gluten is thrown to an inner wall of the cylindrical tube 9 by the screw wing 12 rotating with the high speed and a paste of the seasoned flour type is formed without difficulty in spite of the large quantity of kneading water supplied.

The rotation speed of the rotating shaft 11 of the kneading member 2 is preferably in the range of 900 to 2500 rpm.

The rotation speed of the rotating shaft 11 is in reverse proportion to a diameter of the cylindrical tube 9 of the kneading member 2. According to the experimental data, the rotation speed of the rotating shaft 11 was required to be 900 rpm in the case where the diameter of the cylindrical tube 9 was 26 cm and the rotation speed of the rotating shaft 11 was 2500 rpm when the diameter of the cylindrical tube 9 was 9 cm.

However, it is preferable to set the rotation speed ranging from 900 rpm to 2500 rpm, depending on which speed is suitable according to the characteristics of the noodle and the kinds of the grain flour. Further, a preferable range for the helix angle of the blade 13 is from an angle of twenty degrees to seventy degrees with respect to the rotating shaft 11 in accordance with the characteristics of the vermicelli and the kinds of the grain flour.

As has been described, the noodle element forming member 3 of the rolling-type noodle manufacturing unit $A_1$ is provided with the cogging roller 14, rolling roller 15, the finishing roller 16 and the cutting roller 17. In addition, there is provided a driving motor $M_4$ for driving the cogging roller 14, a driving motor $M_5$ for driving the rolling roller 15, and a driving motor $M_6$ for dirving the finishing roller 16. In this case, it is preferable to use a braking motor for each of the driving motors $M_4$, $M_5$ and $M_6$ in order to make the cogging roller 14 perform the inertia driving and is preferable to connect each of the rollers by means of belts for feeding the noodle substrate. The cogging roller 14 is arranged adjacent to the second spout 10b of the kneading member 2.

Figure 5:
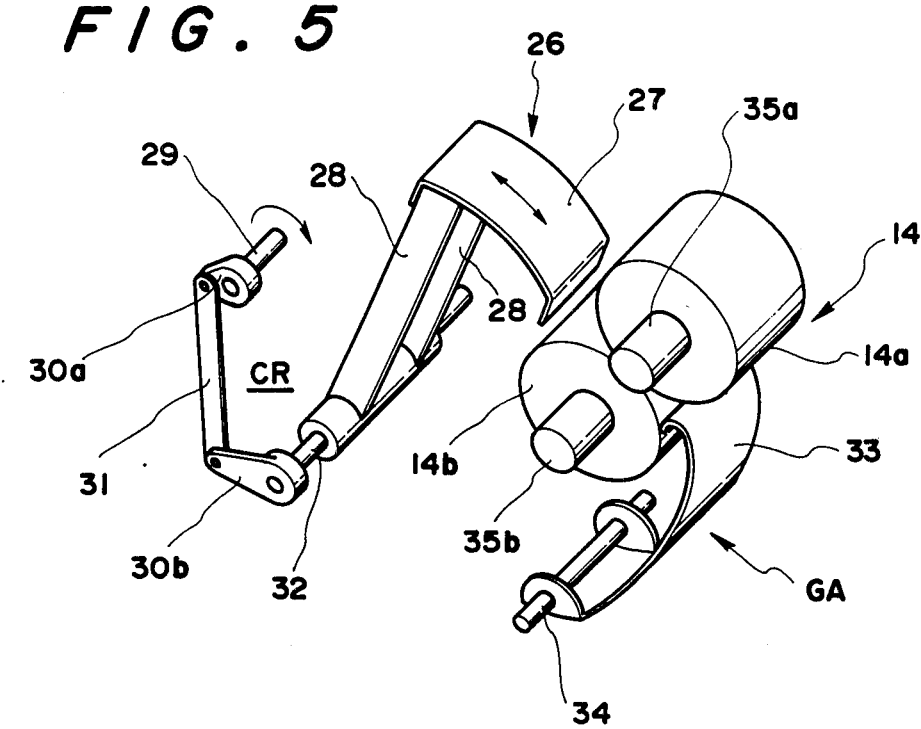
FIG. 5 is a perspective view of a cogging roller of the boiled noodles manufacturing apparatus of FIG. 1.

A noodle substrate pushing member 26 is arranged to an upper side of the cogging roller 14. As is shown in FIG. 5, the substrate pushing member 26 comprises an arc-shaped pushing plate 27 having a curved portion formed on one end portion of the pushing plate 27, supporting plates 28 connected to the other end portion of the pushing plate 27 and a crank member CR connected to the pushing member 26. The crank member CR comprises a driven shaft 29 driven by the motor $M_4$, first cam 30a secured to the driven shaft 29, a lever 31 connected rotatably to a first cam 30a, a second cam 30b connected rotatably to the lever 31 and a crank shaft 32 secured to the second cam 30b and connected to the supports 28. The substrate pushing member 26 operates by reciprocal movement from the operation of the crank CR and push to thereby supply the noodle substrate between the rolls 14a and 14b of the cogging roller 14. A gating member GA is provided on a lower side of the cogging roller 14. As is shown in FIG. 5, the gating member GA comprises a semi-circular shaped gating plate 33 and a supporting shaft 34. The gating plate 33 is inserted into and disengaged from a gap formed between the rolls 14a and 14b of the cogging roller 14 by the rotation of the supporting shaft 34 to open and close the gap.

Figure 6:
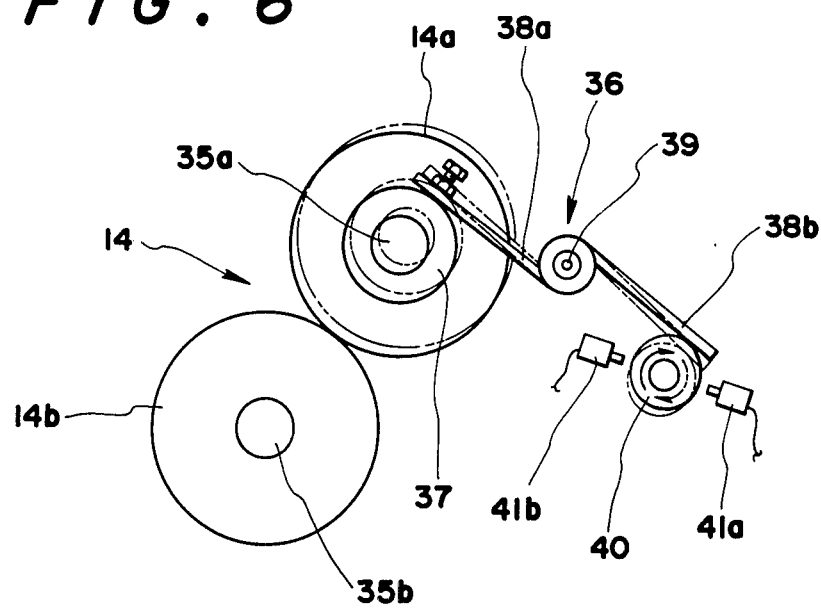
FIG. 6 is a view showing an operation of a cogging roller of the boiled noodles manufacturing apparatus of FIG. 1.

As is shown in FIG. 6, the noodle element forming member 3 further comprises a roller actuating member 36 for actuating the cogging roller 14. The roller actuating member 36 comprises a bushing 37 fastened to the shaft 35a of the roll 14a of the cogging roller 14, a first actuating lever 38a connected to an outer surface of the bushing 37, a supporting shaft 39 supporting one end portion of the first lever 38a, a second actuating lever 38b fastened to the supporting shaft 39, an eccentric cam 40, a first limit switch 41a and a second limit switch 41b. The other roller 14b is supported on shaft 35b.

The second lever 38b is pivotally rotated with respect to supporting shaft 39 as a supporting point to move the roll 14a of the roller 14. The cam 40 is rotated by the braking moto $M_4$. The first and second limit switches 41a and 41b are thus actuated by the rotation of the braking motor $M_4$.

Moreover, as is shown in FIGS. 1 to 3, it is preferable to provide dial-type indicators 14D, 15D and 16D and gap adjusting handles 14T, 15T and 16T on the rollers 14, 15 and 16, respectively, for easily and precisely adjusting the gaps of the rollers. It is also preferable to provide dial indicators on the grain flour supplying member 1 and the kneading water supplying member 4.

The cogging rollers 14 are constructed so that the rolls 14a and 14b are closely engaged with each other during the feed of the noodle substrate thereto. The gating member GA is inserted between the rolls to open the gap formed between the rolls 14a and 14b when the supply of the noodle substrate is finished.

The cogging roller 14, as constructed above prevents the dropping out of the noodle substrate such that the seasoned noodle substrate is compressively contacted with the rolls 14a and 14b of the cogging roller 14 and the noodle substrate is formed without waste of the noodle substrate.

The noodle manufacturing apparatus further comprises a controlling member for controlling the operation of the raw noodle manufacturing unit $A_1$ and the boiling operation of the boiling unit B. The controlling member includes a sensor means 42 for sensing the movement of the boiling basket 25.

Figure 7A:
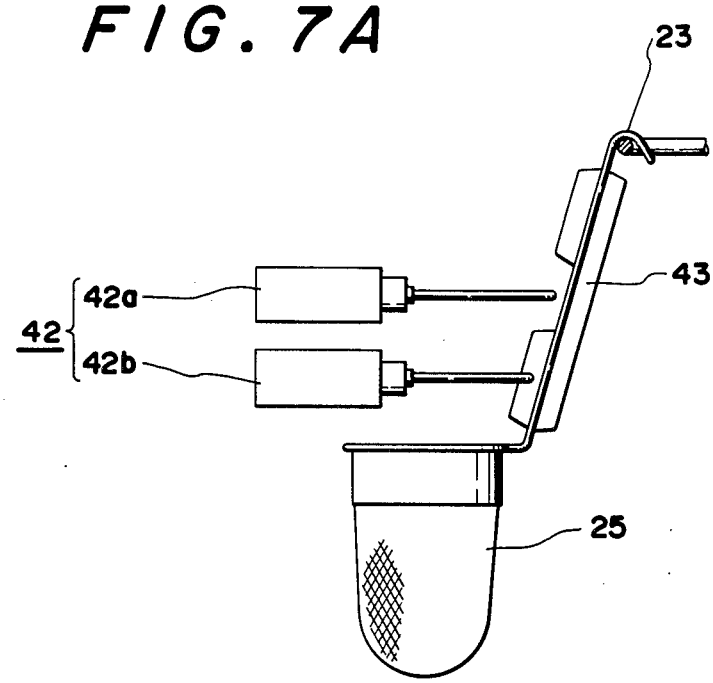
FIGS. 7A and 7B show two different designs for a boiling basket forming a part of the boiled noodles manufacturing apparatus of FIG. 1.
Figure 7B:
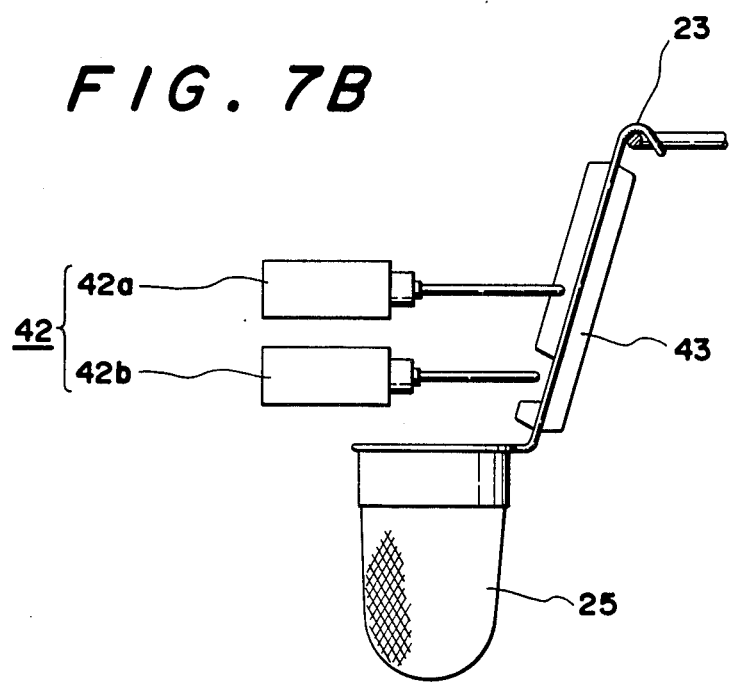

As is shown in FIGS. 7A and 7B, the sensor means 42 comprises a starting sensor 42a for sensing the start of the boiling and a finish sensor 42b for sensing the finishing of boiling. The shape of the handle 43 of the basket 25 can be selected in accordance with the kinds of the vermicelli in the form of the Japanese noodle, the buckwheat, the macaroni, the Chinese noodles or the like. Each of the boiling baskets 25 corresponding to the kinds of vermicelli is detected by the start sensor 42a and the finish sensor 42b. It is preferable to make the handle 43 of the boiling basket 25 different colors in order to make the basket easily distinguishable. FIG. 7A shows the boiling basket 25 for boiling the Japanese noodle, and FIG. 7B shows the boiling basket 25 for boiling the buckwheat.

As is shown in FIG. 1, the start sensor 42a is mounted on the boiling unit B so as to be located in the vicinity of and nearer to an outlet of the noodle element forming member 3. The finish sensor 42b is arranged in the vicinity of the boiling finishing position. A point ZK shows a position for hanging the boiling basket 25. The start sensor 42a senses the arrival and the passage of the basket 25 and produces an electric signal for starting the operation of the noodle manufacturing unit $A_1$. The finish sensor 42b detects the arrival of the basket 25 to the point E and produces an information signal for activating an information device in the form of a lamp, a buzzer or the like. The information device is provided in order to provide a light or generate an information transferring signal in accordance with the arrival of the boiling basket 25 to the point E in order to announce the finish of the boiling. Although a rotating direction of the rotating wheel 18 is shown by a righthanded rotation (clockwise direction) in the drawing, the rotating direction can be illustrated by lefthanded rotation if it is desired.

A stirring bar (not shown in the drawings) can be arranged on the upper end portion of the noodle boiling unit B so as to be movable toward the upper and lower directions and thereby stirring the noodle in the basket 25 during the stopping interval of the intermittent rotation of the boiling basket 25. Each batch of noodles is boiled by intermittently moving the boiling basket 25, which is inserted into the boiling water and thereafter is removed from the boiling water. Data for the predetermined batches of noodles and the kinds of the vermicelli are inputted in a micro-computer of the controlling member. The micro-computer receives an electric signal from the start sensor 42a and supplies an actuating signal to each part of the noodle manufacturing equipment at a predetermined timing. The micro-computer also stores the data of the grain flour and the kneading water, the starting and stopping timings of measuring and supplying the raw noodle manufacturing unit $A_1$ and the boiling unit B, data of the rotation of the shaft 11 of the kneading member 2 and data of starting of the pushing plate 27, the gate GA and the eccentric cam 40 of the noodle element forming member 3, data for starting the cogging roller 14, the rolling roller 15, the finishing roller 16 and the cutting roller 17 and data of the timing responding to the intermittent rotation of the rotating wheel 23 of the noodle boiling unit B.

Figure 8:
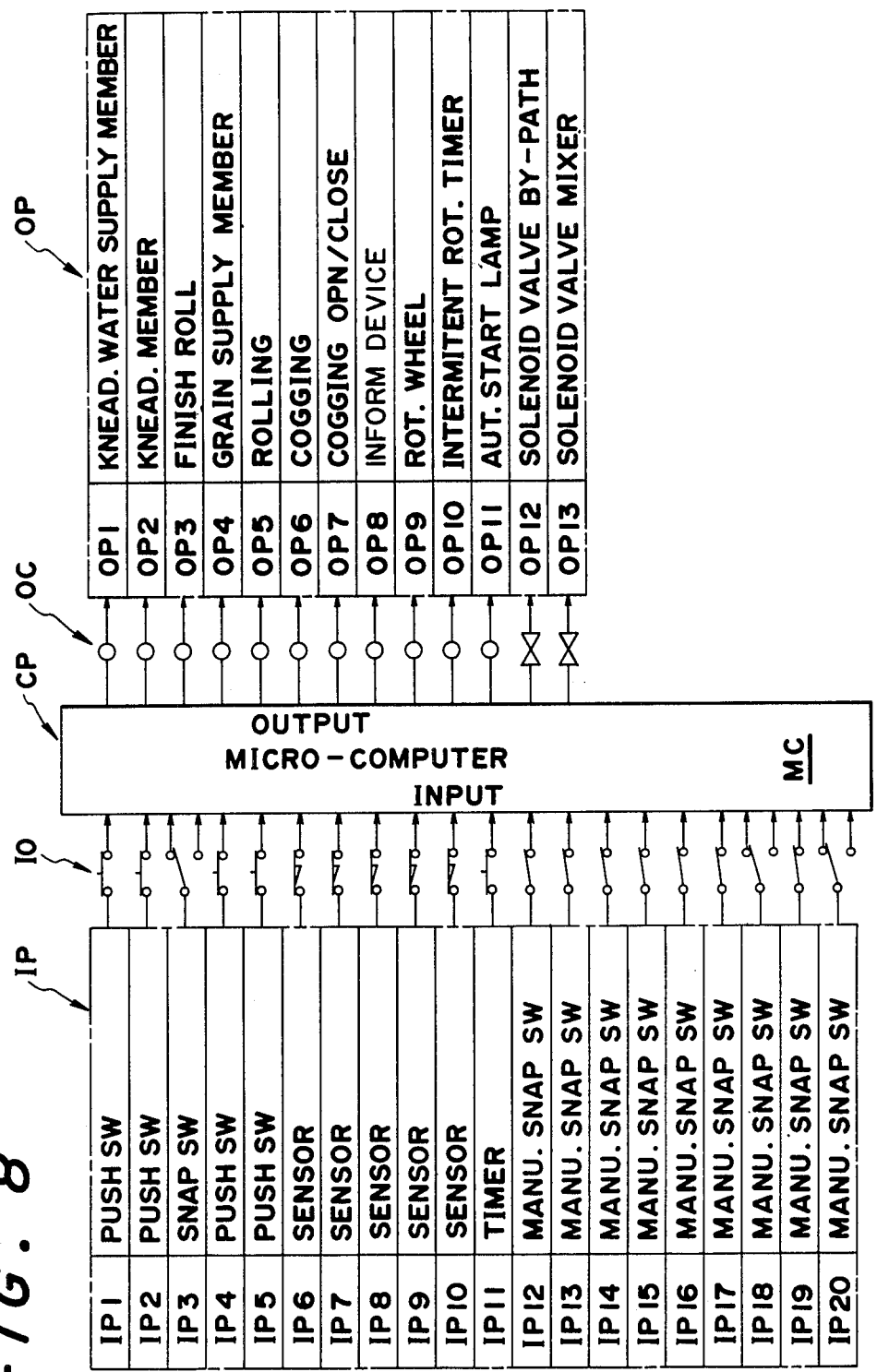
FIG. 8 is a block diagram of a control unit for controlling the boiled noodles manufacturing apparatus of the present invention.

FIG. 8 shows the control unit for controlling the operation of the raw noodle manufacturing unit $A_1$ and the boiling unit B. The controlling unit comprises an instruction inputting member IP for producing instructions in order to operate the raw noodle manufacturing unit $A_1$ and the boiling unit B, an input operating member IO, a calculation processing member CP, an output controlling member OC, and an output processing member OP.

As is best shown in FIG. 8, the instruction imputting member IP comprises a plurality of instruction inputting elements IP1–IP20. Each of the instruction signal generating elements IP1–IP20 is, respectively, includes an electrical element and generates an instructing signal as is shown in the instruction inputting member IP. The calculation processing member CP includes a microcomputer MC having memories. The micro-computer MC is electrically connected to the instruction inputting member IP. The output processing member IO comprises a plurality of actuation signal generating elements OP1–OP13. Each of the actuation signal generating elements OP1–OP13 is effective to control the operations of the raw noodle manufacturing unit $A_1$ and the boiling unit B, respectively, shown in FIG. 8.

The desired number of meals and the kinds of the vermicelli can be inputted to the memories of the calculation processing member CP by operating the input signal generating elements IP1–IP20. The micro-computer MC receives the electrical signals and then outputs the instruction signals to each portion of the raw noodle manufacturing unit $A_1$ and the boiling unit B. The micro-computer MC stores the data for the timed operation of the grain flour supplying member 1, the data for the timed operation of starting and stopping operations of the kneading member 2, the data for the timed operation of the pushing plate 27, the gating member GA, the cogging roller 14, the rolling roller 15, the finishing roller 16 and the cutting roller 17 of the noodle element forming member 3, the data of the intermittent rotation of the rotating wheel 23 of the boiling unit B corresponding to the kinds of the noodle.

The microcomputer MC further supplies an operating instruction to the informing device and controls a temperature of the boiling water.

In the instruction inputting member IP, the instruction signal generating element IP1 generates a driving signal for driving the apparatus; the element IP2 generates a stopping signal for stopping the operation of the apparatus; the element IP3 generates an automatic or manual instruction signal; the element IP4 generates a stopping signal; IP5 generates a starting and IP6 generates a stopping signal for controlling the moving operation of the boiling basket; IP7 generates a water supplying signal; IP8 produces a signal for opening the cogging roller; IP9 generates a signal for closing the cogging roller; IP10 generates a boiling start signal; IP11 generates a boiling finish signal; IP12 generates a signal of the stopping time interval of the boiling basket; IP13 generates a signal for controlling the kneading member 2; IP14 generates a signal for controlling the cutting roller; the element IP15 generates a signal for controlling the grain flour supplying member; IP16 generates a signal for controlling the roller; the element IP17 generates a signal for controlling the starting and stopping operations of the cogging roller; IP18 generate signals for controlling the opening and closing operations of the cogging roller; the element IP19 generates a signal for controlling the rotation of the rotating wheel and the instruction signal generating element IP20 generates signals for controlling the supply of the kneading water (to the kneading member or by-pathing).

Operation of the boiled noodles manufacturing apparatus shown in FIGS. 1–7 will be described as follows.

It can be assumed that 10 kg of wheat flour is inserted into the container 7 of the grain flour supplying member 1 and, on the other hand, the kneading water containing a salt water of 7 Be concentration of salt is filled into the kneading water tank 18, and that two customers come into the shop and thereafter three more customers come into the shop.

In this case, two boiling baskets 25 are hung on the hanging hooks 24. After the two baskets 25 are hung on the hooks 24 in a position ZK (FIG. 1), the start sensor 24a is activated by the handle 43 of the boiling basket 25 at a starting position MS. By the activation of the start sensor 42a, the starting signal is produced in the instruction inputting member IP shown in FIG. 8. The starting signal produced in the instruction inputting member IP is supplied to the microcomputer MC by way of the input operating member IO. The micro-computer MC outputs an instruction signal to the actuation signal outputting elements OP1, OP4 and OP12 of the output processing member OP by way of the output controlling member OC, according to a program inputted to the micro-computer MC. When the actuation signal outputting elements OP1, OP4 and OP12 receive the actuation signal from the micro computer MC, the grain flour supplying member 1 and the kneading water supplying member 4 are actuated to start the operation and, at the same time, the electric valve is by-passed. By the operation of the grain flour supplying member 1, the grain flour corresponding to one meal (such as 65 g) is supplied to the kneading member 2. By the operation of the kneading water supplying member 4, the kneading water (such as 35 cc) is supplied to the kneading member 2 according to the programming. In the kneading member 2, the pulverized powder of the wheat flour is instantaneously hydrolyzed by mixing with the kneading water by means of the operation of the high speed rotating beater of the kneading member 2. The hydrated wheat flour passes through the kneading member 2 for about ten seconds and becomes a seasoned-shaped substrate. The substrate ejected from the kneading member 2 is fed to the cogging roller 14. When the substrate is supplied to the cogging roller 14, the pushing plate 27 of the substrate pushing member 26 shown in FIG. 5 pushes the substrate piled in the roller between the rolls 14a and 14b of the cogging roller 14 while the cogging roller 14 is closed, according to the instruction signal supplied to the actuation signal outputting element OP7. The microcomputer MC further supplies the instruction signal to the actuation signal outputting element OP6 according to the programming. The actuation signal from the element OP6 controls a cogging roller 14 to form the gap between rolls 14a and 14b and to start the rotating operation. A coarse substrate of the noodle is generated by the rotating operation of the cogging roller 14.

The coarse noodle substrate created by the cogging roller 14 is fed to the cutting roller 17 by way of the rolling roller 15 and the finishing roller 16. The cutting roller 17 has, for example, blades of twenty counts and creates raw noodles having a thickness of 1.7 mm and a width of 2.7 mm.

The instruction signals are further supplied from the microcomputer MC to the actuation signal outputting element OP9 and OP10. The actuation signal outputting elements OP9 controls the rotating wheel 23 to begin the intermittent rotation in order to locate the first boiling basket 25 to the lower side of the cutting roller 17, and thereby the raw noodle elements are inserted into the first boiling basket 25.

The data of the intermittent motion of the rotating wheel is inputted to the microcomputer so that the movement of the first boiling basket 25 is prevented until the insertion of the raw noodle elements is finished.

Next, the start sensor 42a further senses the arrival and passage of the second boiling basket 25. The sensing signal of the start sensor 42a is supplied to the microcomputer MC and thereby each portion of the grain flour supplying member 1 and the kneading water supplying member 4 is actuated by the previously identified operations.

It is assumed that the three additional baskets are not immediately hung on to the hanging hooks 24 for at least one minute after the visiting of the next three customers. Accordingly, the start sensor 42a is not activated and, therefore, the supply of the wheat flour and the kneading water is not carried out. During this interval, the raw noodles are not fabricated, although the rotating wheel 23 is intermittently rotated until the next boiling basket arrives at the point E. Inexperienced operators, therefore, can fabricate the boiled noodles only by hanging the boiling baskets 25 on the hooks 24, since the boiled noodles are automatically manufactured in accordance with the number of the baskets previously hung on the hooks according to the number of customers.

In the boiling unit B, the finish sensor 42b senses when a basket arrives at the point E (finishing portion of the boiling of the noodles) and supplies the finishing signal to the microcomputer MC. The microcomputer MC processes the finishing signal and thereafter supplies the control signals to the actuating signal outputting element OP8 to inform an operator of the finish of boiling by actuating the information device such as a buzzer or a chime. When the customer likes soft boiled noodles, the boiling basket must be taken up from the boiling water at the point in time that the boiling basket passes through the point E and the noodles can be served to the liking of the customer.

Table 1 shows various examples of the boiled noodles manufactured according to the present invention. The data in Table 1 is for the Japanese noodles, the buckwheat, the Chinese style noodles and the spaghetti which are manufactured according to the present invention. Table 2 illustrates the necessary boiling time intervals for boiling the noodles by the method of the present invention and by the prior art method. As is apparent from the Table 2, the boiled noodles can be manufactured according to the present invention during a very short time interval in the range of from 1/100 to 1/4,000 of the time required to make the noodles by the method of the prior art.

TABLE 1

|  | Japanese noodle | Buckwheat | Chinese noodle | Spaghetti |
| --- | --- | --- | --- | --- |
| Used grain flour | Wheatflour 100% | Buckwheat flour: 50% Wheatflour 50% | Wheatflour 100% | Wheatflour 100% |
| Kneading water | Salt. water 7Be | Salt. water 2Be | Brine water 4Be | Water |
| Wheat flour (weight) | 65 g | 70 g | 68 g | 70 g |
| Volume of kneading water | 35 ml | 35 ml | 35 ml | 19 ml |
| Water (%) | 54% | 50% | 51% | 27% |
| Kneading time | 8 sec. | 8 sec. | 8 sec. | 8 sec. |
| Raw noodle manufacturing time | 9 sec. | 10 sec. | 10 sec. | 10 sec. |
| Thickness of raw noodle | 1.7 mm | 1.4 mm | 1.4 mm | 2.1 mm |
| Width of raw noodle | 2.7 mm | 2.0 mm | 2.0 mm | 2.1 mm |
| Boiling position | 250° | 94° | 94° | 125° |
| Boiling time | 4 minutes | 1.5 minutes | 1.5 minutes | 2 minutes |

TABLE 2

|  |  | Japanese noodle | Buckwheat | Chinese-style noodle | Spaghetti |
| --- | --- | --- | --- | --- | --- |
| Time factor | Boiled noodle manufacturing time (present invention) | 18 (sec) | 18 (sec) | 18 (sec) | 18 (sec) |

TABLE 2-continued

|  | Japanese noodle | Buckwheat | Chinese-style noodle | Spaghetti |
|---|---|---|---|---|
| Boiled noodle manufacturing time (Prior art) | 4–16 (hours) | 30–45 (minutes) | 3–16 (hours) | 20 (hours) including drying time |
| Ratio of necessary times of the invention and prior art | 1/847–1/3,388 | 1/100≅1/150 | 1/600–1/3,200 | 1/4,000 |

Figure 9:
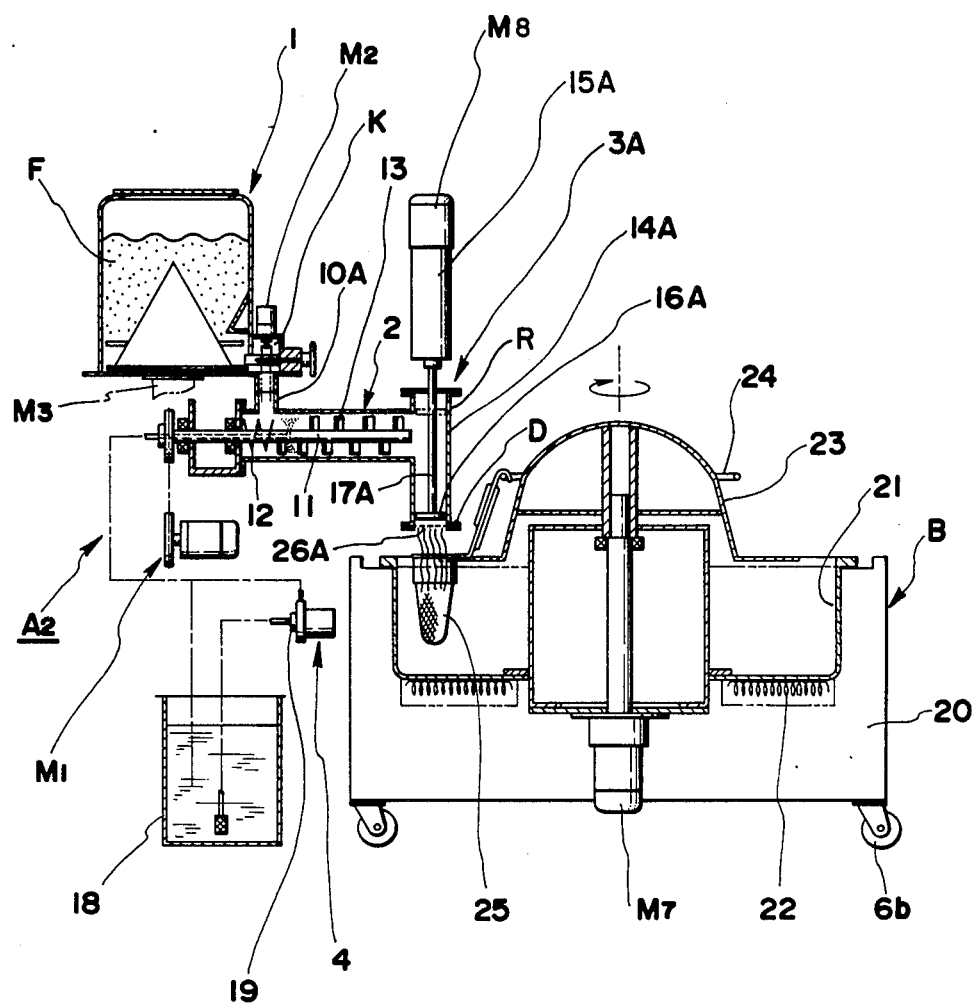
FIG. 9 is a side elevational section view of a modification of the boiled noodles manufacturing apparatus of FIG. 1.

FIG. 9 shows a modification of the boiled noodle manufacturing apparatus of the present invention. The boiled noodles manufacturing apparatus of FIG. 9 includes a raw noodle manufacturing unit $A_2$ of the compressing outlet type. The boiled noodles manufacturing apparatus of FIG. 9 is similar to that of FIGS. 1–7 except that a noodle element forming member 3A is used having a compressing outlet type. In FIG. 9, the identified or corresponding parts with FIG. 2 are illustrated by the same reference characters.

The noodle element forming member 3A comprises a cylinder 14A connected to a transferring end portion of a kneading member 2, a compressing plate 16A connected to a shaft 17A is moved reciprocally by a reciprocal mechanism of an air cylinder 15A or a gearing motor M8 for sliding reciprocally in the cylinder 14A, and a die 26A is provided on an end portion of the cylinder 14A. Additionally, a screw-shaped wing can be employed instead of the compressing plate 16A. Furthermore, it is preferable to remove the residual air by connecting a pressure-reducing pump to the cylinder 14A. The die 26A has a large number of holes having a desired shape corresponding to the spaghetti or the Korean style ra'amen and is removably connected to the cylinder 14A. The outlet pressure of the noodle element forming member 3A is adjustable to the necessary pressure corresponding to the kinds of the noodles desired. The compressing plate 16A is located initially at an upper position R during the supply of the noodle substrate and thereafter returns to the R-position after moving toward a lower position such that the compressing plate 26A reaches an inner surface of the die 16A. The noodle elements transferred from die 26A are received in a boiling basket 25. The reciprocal operation of the compressing plate 16A is controlled by instructions from the microcomputer MC. The boiled noodles manufacturing apparatus of the compressing outlet type fabricates one meal of boiled noodles from the raw grain flour by the same method used in the roll-typed manufacturing apparatus. Additionally, the noodle element forming member 3A can be set horizontally in stead of in the vertical direction.

The apparatus of FIG. 9 fabricates the noodles in accordance with the starting and stopping operations based on the timings of the instructions stored in the microcomputer MC, corresponding to the quantity of the grain flour of the meal and the quantity of the kneading water to be added. The apparatus of FIG. 9 has, accordingly, a very different feature from that of the apparatus of the prior art.

The present invention can also provide a boiled noodles manufacturing apparatus which combines two to five sets of the raw noodle manufacturing units which have different counts of the cutting roller, or two to five compressing outlet type machines, each of which has a die 26A with holes of a different shape and size. This type of combined boiled noodles manufacturing apparatus makes more effective use of the floor area, provides greater efficiency of the operation, reduces installation costs, reduces energy consumption and provides versatility in obtaining many kinds of boiled noodles by one set of apparatus, such as the predetermined five kinds of noodles which can be fabricated by combining five raw noodle manufacturing units and one boiling unit.

Figure 10:
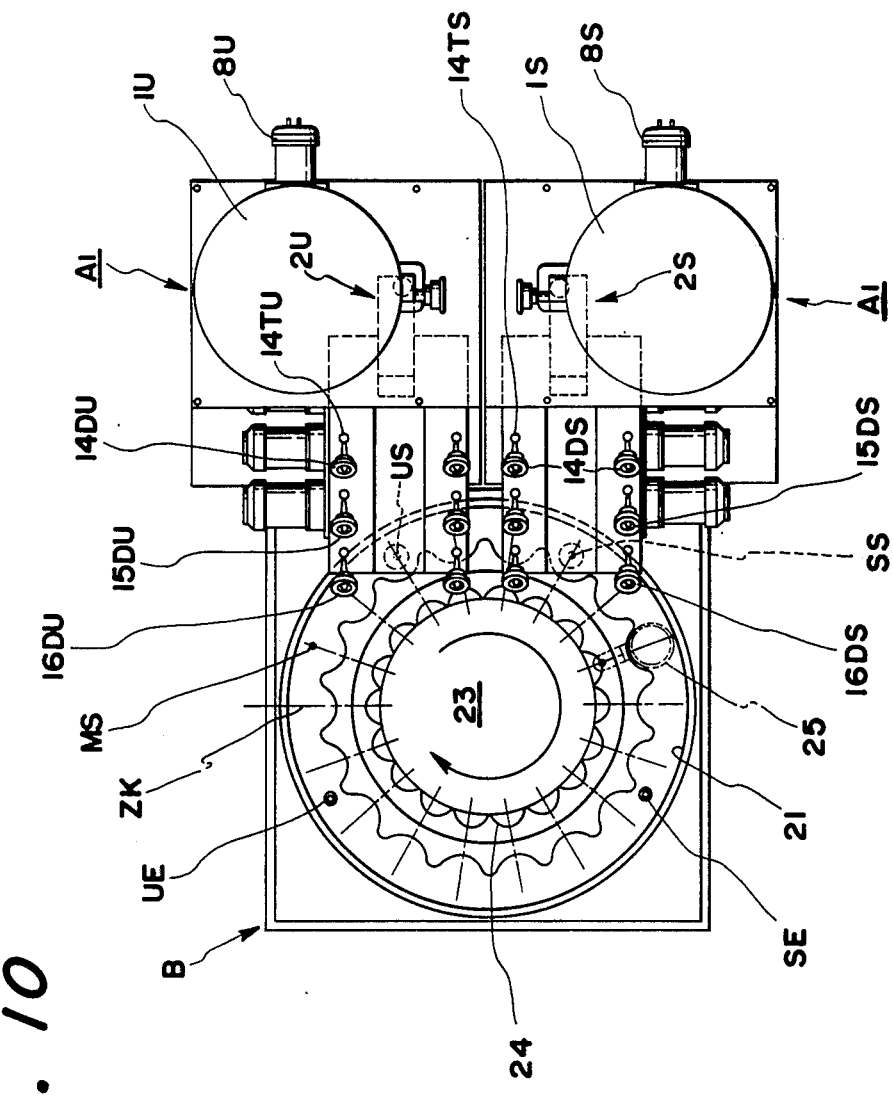
FIG. 10 is a plan view of a boiled noodles manufacturing apparatus according to a second embodiment of the present invention.
Figure 11:
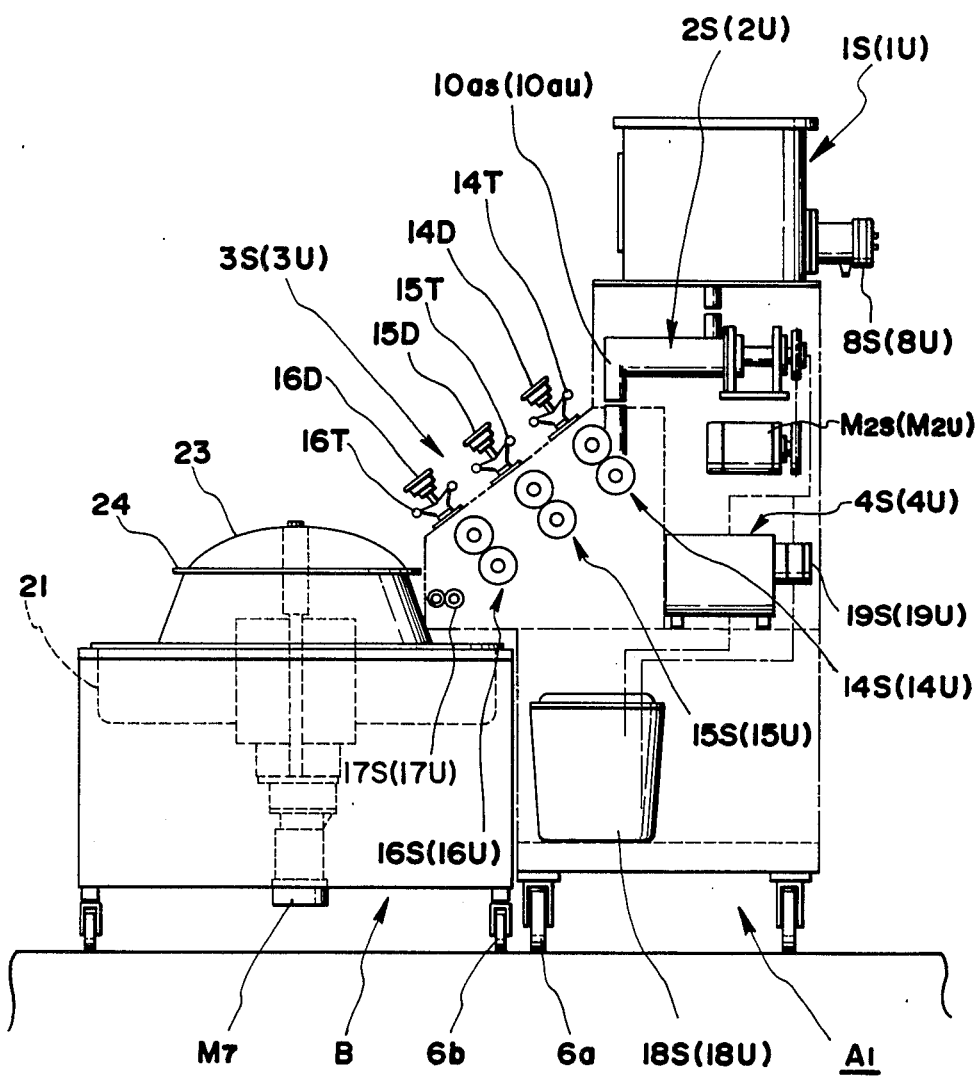
FIG. 11 is a side elevational sectioned view of the boiled noodles manufacturing apparatus of FIG. 10.

FIGS. 10 and 11 show a further embodiment of the boiled noodle manufacturing apparatus of the present invention. The apparatus comprises a raw noodle manufacturing unit for manufacturing raw Japanese noodles, a raw noodle manufacturing unit for fabricating the raw buckwheat and a boiling unit B. In FIGS. 10 and 11, like parts are identified by the same reference characters as those of FIGS. 1 to 3. In FIGS. 10 and 11, an alphanumeric character U represents the corresponding portion of a machine for manufacturing the Japanese noodles and an alphanumeric character S shows the corresponding portion of a machine for fabricating the buckwheat. Furthermore, an alphanumeric character US represents a position for inserting the Japanese noodles into a boiling basket 25, a character UE represents a finishing position of boiling the Japanese noodles, SS shows a position for inserting raw buckwheat into the boiling basket 25, SE shows a finishing position of boiling the buckwheat and MS represents a start instructing position.

In the boiled noodle manufacturing apparatus of FIGS. 10 and 11, assuming that a wheat flour of ten kilograms (kg) is stored in a grain flour supplying member 1; a mixed grain flour (buckwheat flour: 70%; wheat flour: 30%) of 10 kg is stored in a grain flour supplying member 1S; a kneading water of eight liters, containing a salt of seven Baume, is stored in a kneading water supplying member 18U, and a kneading water of eight liters, containing a salt of two Baume, is stored in a kneading water supplying member 18S. Under these conditions, boiling water in a tank 21 is heated by turning on a power source of ten kilowatts for an electric heater 22 by operating an automatic switch of an operating panel (not shown in the drawing).

Under these conditions, it is possible to service six customers by offering various kinds of noodles and buckwheats, for example, a Tempura buckwheat, a Zaru buckwheat, a hard boiled noodle, a Carrei noodle and a Tempura noodle. As is shown in FIG. 10, three baskets 25 for receiving raw noodle elements which require a long boiling interval are, in turn, hung on a hook 24 of a rotating wheel 23 which is rotating intermittently. In this case, each of the handles of the noodle boiling baskets 25 is white in order to distinguish it. Next, three buckwheat boiling baskets 25 are, in turn, hung on the hooks 24 of the rotating wheel 23. The handles 43 of the buckwheat boiling baskets are orange.

When the first noodle boiling basket 25 arrives at the boil start instructing position MS, a boil start sensor senses the first noodle boiling basket 25 and generates an electrical sensing signal. The electrical sensing signal operates the control unit to actuate each of a grain flour supplying member 1U, a kneading water supplying member 4U and a kneading member 2U of the raw noodle manufacturing unit A₁. By the operations of these members, the quantities of the wheat flour and the noodle kneading water corresponding to one meal are supplied to the kneading member 2U. The kneading member 2U produces a seasoned noodle substrate. The noodle substrate is supplied to a cogging roller 14U after eight seconds. During this time interval, rolls of the cogging roller 14U are closed and in contact with each other, at the same time, a pushing plate is activated. After a given time interval, the cogging roller is operated by an instruction from the microcomputer MC (shown in FIG. 8) until the cogging roller 14U forms a gap of 2.2 (mm) and the noodle substrate is produced by the cogging roller 14U. The noodle substrate generated by the cogging roller 14U is moved toward a rolling roller 15U and is rolled. The rolled substrate is moved toward a finishing roller 16U and a cutting roller 17U to form the raw noodle elements having a thickness of 1.7 mm, a width of 2.7 mm and a length of 22 cm, corresponding to the quantity of one meal after nine seconds. The raw noodle elements are received in a basket 25 stopping below the cutting roller 17U and thereafter rotating wheel 23 is intermittently rotated in response to the instructing signal from the microcomputer. In this manner, the raw noodle elements are, in turn, received into the second and third noodle boiling baskets.

When the fourth boiling basket 25 for boiling the buckwheat arrives at the boil start instructing position MS, the boil start sensor detects the basket and generates a detecting signal. Each of a grain flour supplying member 1S, the kneading water supplying member 4S and the kneading member 2S is activated according to the programming of the microcomputer MC of the control unit. By the activation of these members, the mixed grain flour corresponding to one meal is supplied to the kneading member 2S and thereafter a seasoned buckwheat substrate is produced from the kneading member 2S. The substrate from the kneading member 2S is stored in the front portion of the buckwheat manufacturing unit A₁ and the boiling unit B, thereafter carries out the same operations as described above. In thus manner, the raw buckwheat noodle elements are, in turn, inserted into the fifth and sixth boiling baskets.

When the first boiling basket for boiling the Japanese noodles arrives at the noodle boiling finish position UE after four minutes, the informing device is operated in response to the sensing signal of the sensor to inform the operator of the finish of boiling. The operator can remove the boiling basket from the tank 21. The operator can also serve the good tasting Japanese noodles or the good tasting buckwheat, since the Japanese noodles and the buckwheat are boiled for the appropriate time periods.

When each of the fourth to sixth boiling baskets for boiling the raw buckwheat elements arrive at the position SE after one minute and thirty seconds, the sensor detects the finish of boiling of the buckwheat and generates the informing signal. By the informing signal, the operator can easily tell when the boiling of the buckwheat is finished.

For a case where one customer likes a hard boiled Japanese noodle, the third basket must be taken up from the boiling water as well as the second basket when the second basket arrives to the boil finishing position and thereafter the hard boiled Japanese noodle can be also offered to the customer after washing it. Accordingly, good tasting boiled noodles can be offered to the customers according to their individual tastes. In this manner, the Japanese noodles from the substrate can be provided in the same waiting time for the sixth customer, since the Japanese noodle boiling baskets are inserted into the boiling oven prior to the buckwheat boiling baskets. The apparatus of FIGS. 10 and 11 can fabricate one meal of the various kinds of the boiled noodles during a during very short time interval in comparison with the prior art apparatus, according to the customer's requirements, and without the loss of preparation, the loss of the substrate and without using the open fire.

Furthermore, the present invention provides a manufacturing method and an apparatus which can fabricate not only the Japanese noodle, the buckwheat and ra'amen, but also the macaroni and the spaghetti according to the number of the customers.

As explained earlier, the present invention is characterized as follows:

(1) The raw grain flour and kneading water are automatically measured for each individual meal.

(2) In a kneading member having a high speed beater, a grain flour is pulverized and kneading water is sprayed to be hydrated instantaneously.

(3) A grain flour is ground against an inner wall of a cylindrical tube and a pulverized grain flour is created during very short time interval such as seven seconds.

(4) Raw noodle elements are created from a noodle element forming member in nine to ten minutes.

(5) Raw noodle elements fabricated by the noodle element forming member are received in boiling baskets at every time interval such as one meal, and therefore the turbidity of the boiling water is avoided.

(6) Complex operations of the apparatus are programmed within a computer and, therefore, inexperienced operators can easily perform the fabrication of noodles by means of carrying out simple operations such as hanging the desired number of boiling baskets, inputting the data of the kinds of noodles desired and the number of meals to a control unit.

Although the present invention has been described by way of preferred embodiments thereof, it should be pointed out that these can be modified at will within the scope of the appended claims without modifying or altering the nature of the present invention.

What is claimed is:

1. A boiled noodles manufacturing apparatus comprising in combination:

at least one raw noodle manufacturing unit including a grain flour supplying means for supplying and measuring grain flour, a kneading means connected to said grain flour supplying means for kneading said grain flour, said kneading means including a worm-shaped screw wing and a blade, a kneading water supplying means for measuring and supplying kneading water to said kneading means for kneading said grain flour into a kneaded noodle substrate and a noodle element forming means connected to said kneading means for forming raw noodle elements from said kneaded noodle substrate; and a boiling unit for boiling said raw noodle elements fed from said noodle element forming means including a rotating wheel which is rotatable intermittently and which supports at least one removable basket which receives said raw noodle elements, a sensor means for producing an electric signal when sensing said basket passing through a predetermined position, a controlling unit means generating electric signals corresponding to a predetermined number of meals for controlling said at least one raw noodle manufacturing unit and said boiling unit, whereby the predetermined number of meals is fabricated from said grain flour by controlling starting and stopping operations of said at least one raw noodle manufacturing unit and said boiling unit by said electric signals from said controlling unit means.

2. A boiled noodles manufacturing apparatus as claimed in claim 1, wherein said noodle element forming means of said at least one raw noodle manufacturing unit comprises a cogging roller for coarsely rolling said kneaded noodle substrate produced by said kneading means, a rolling roller for rolling said noodle substrate coarsely rolled by said cogging roller, a finishing roller for rolling said noodle substrate rolled by said rolling roller and a cutting roller for cutting and slicing said noodle substrate rolled by said finishing roller to form said raw noodle elements and wherein said boiled noodles manufacturing apparatus comprises one raw noodle manufacturing unit or a plurality of raw noodle manufacturing units each of which has a cutting roller with counts which differ from each other.

3. A boiled noodles manufacturing apparatus as claimed in claim 2, comprising a combination of a plurality of raw noodle manufacturing units, and one boiling unit for boiling raw noodle elements fabricated from said raw noodle manufacturing units.

4. A boiled noodles manufacturing apparatus as claimed in claim 3, wherein said cogging roller of said noodle element forming means comprises a pair of rolls having a gap therebetween and a gating member for opening and closing said gap, whereby said gap is opened and closed by means of said gating member.

5. A boiled noodles manufacturing apparatus as claimed in claim 4, wherein said noodle element forming means includes a pushing plate for supplying said kneaded noodle substrate to said cogging roller.

6. A boiled noodles manufacturing apparatus as claimed in claim 3, wherein said boiling unit includes a plurality of boiling baskets having different shapes and said sensor means comprises a first sensor arranged at a starting position representative of the start of the apparatus and a second sensor arranged at a boiling finish position representative of the finish of boiling.

7. A boiled noodles manufacturing apparatus as claimed in claim 2, wherein said cogging roller of said noodle element forming means comprises a pair of rolls having a gap therebetween and a gating member for opening and closing said gap, whereby said gap is opened and closed by means of said gating member.

8. A boiled noodles manufacturing apparatus as claimed in claim 7, wherein said noodle element forming means includes a pushing plate for supplying said kneaded noodle substrate to said cogging roller.

9. A boiled noodles manufacturing apparatus as claimed in claim 7 wherein said controlling unit means includes a microcomputer which stores data for programming the desired timings, whereby each of a number of operations is carried out at a set timing by data of the predetermined number of meals and the kinds of the noodle inputted to said microcomputer and the electric signal produced by said sensor means, said operations including the automatic measuring and supplying operations of said grain flour supplying means and the supply of water from said kneading water supplying means, the opening and closing of said gap and operation of said cogging roller, the starting and stopping operations of said rolling roller, said finishing roller and said cutting roller, the intermittent rotation of said boiling unit and activating an informing device in the form of an indicating lamp or a buzzer.

10. A boiled noodles manufacturing apparatus as claimed in claim 2, wherein said controlling unit means includes a microcomputer which stores data for programming the desired timings, whereby each of a number of operations is carried out at a set timing by data of the predetermined number of meals and the kinds of the noodle inputted to said microcomputer and said electric signal produced by said sensor means, said operations including the automatic measuring and supplying operations of said grain flour supplying means and the supply of water from said kneading water supplying means, the operation of said cogging roller, the starting and stopping operations of said rolling roller, said finishing roller and said cutting roller, the intermittent rotation of said rotating wheel of said boiling unit and activating an informing device in the form of an indicating lamp or a buzzer.

11. A boiled noodles manufacturing apparatus as claimed in claim 2, wherein said boiling unit includes a plurality of boiling baskets having different shapes and said sensor means comprises a first sensor arranged at a starting position representative of the start of the apparatus and a second sensor arranged at a boiling finish position representative of the finish of boiling.

12. A boiled noodles manufacturing apparatus as claimed in claim 1, wherein said raw noodle element forming means for manufacturing said raw noodle elements comprises a cylindrical tube communicated with said kneading means, a die disposed in said tube for forming noodles of a desired shape and a compressing plate means disposed in said tube for pressing said kneaded noodle substrate through said die.

13. A boiled noodles manufacturing apparatus as claimed in claim 12, wherein said controlling unit means includes a microcomputer which stores data for programming the desired timings, whereby each of a number of operations is carried out at a set timing by data of the predetermined number of meals and the kinds of the noodle inputted to said microcomputer and said electric signal produced by said sensor means, said operations including the automatic measuring and supplying operations of said grain flour supplying means and the supply of water from said kneading water supplying means, the operation of the compressing plate means, resetting operation of the compressing plate means, the intermittent rotation of said rotating wheel of said boiling unit and activating an informing device in the form of an indicating lamp or a buzzer.

14. A boiled noodles manufacturing apparatus as claimed in claim 12, wherein said boiling unit includes a plurality of boiling baskets having different shapes and said sensor means comprises a first sensor arranged at a starting position representative of the start of the apparatus and a second sensor arranged at a boiling finish position representative of the finish of boiling.

15. A boiled noodles manufacturing apparatus as claimed in claim 1, wherein said controlling unit means includes a microcomputer which stores data for programming the desired timings, whereby each of a number of operations is carried out at a set timing by data of the predetermined number of meals and the kinds of the noodle inputted to said microcomputer and said electric signal produced by said sensor means, said operations including the automatic measuring and supplying operations of said grain flour supplying means and the supply of water from said kneading water supplying means, the operation of said noodle element forming means, the intermittent rotation of said rotating wheel of said boiling unit and activating an informing device in the form of an indicating lamp or a buzzer.

16. A boiled noodles manufacturing apparatus as claimed in claim 1, wherein said boiling unit includes a plurality of boiling baskets having different shapes and said sensor means comprises a first sensor arranged at a starting position representative of the start of the apparatus and a second sensor arranged at a boiling finish position representative of the finish of boiling.

* * * * *